Patented Jan. 30, 1951

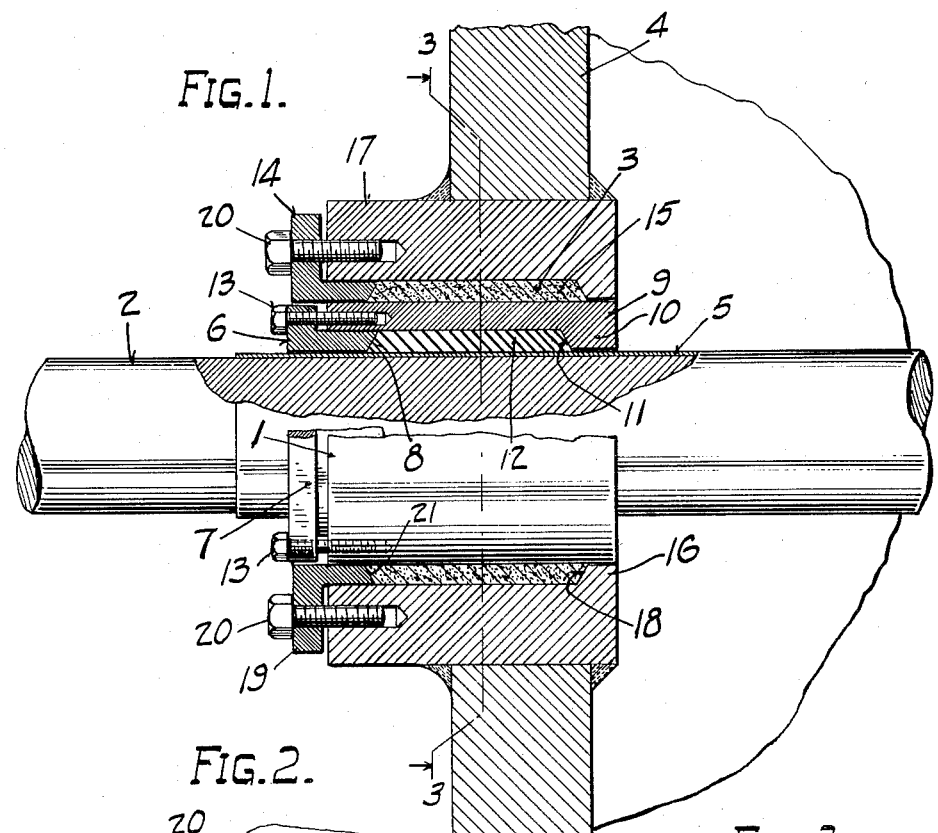
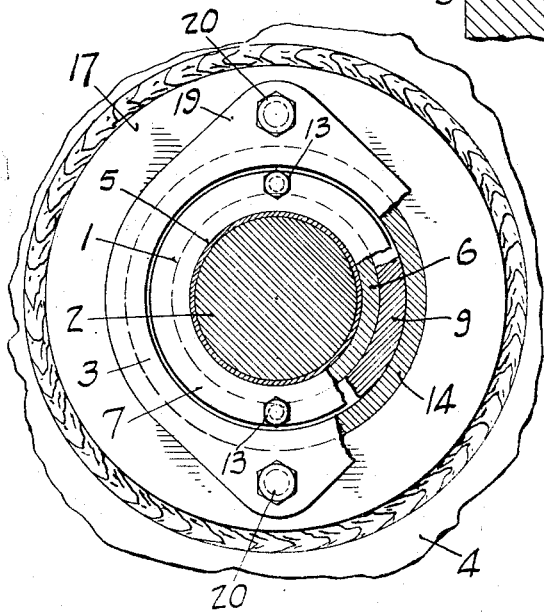
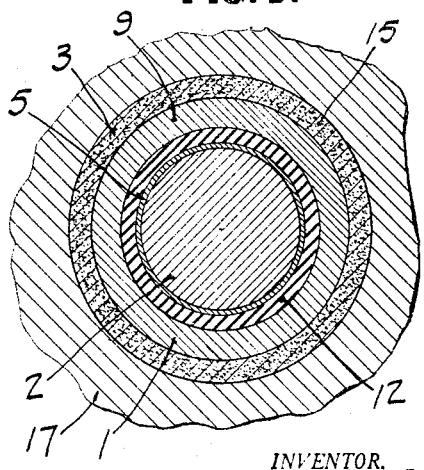

2,539,932

UNITED STATES PATENT OFFICE 2,539,932

BEARING

Henry A. Schmitz, Jr., Shorewood, Wis., assignor to A. O. Smith Corporation, Milwaukee, Wis., a corporation of New York Application May 12, 1945, Serial No. 593,413

4 Claims. (Cl. 308—36.2)

This invention relates to a bearing and has particular reference to a bearing for rotating shafts which are coated with ceramic enamel or other suitable material to protect them from corrosion, as where employed in vessels in which chemical ingredients are mixed.

Where a coated shaft is employed in a vessel to drive a propeller or the like therein for agitation of the contents thereof, the shaft ordinarily is driven by a motor located on the outside of the vessel and rotates within a stuffing box disposed within either the wall or cover of the vessel. Upon continuous rotation within the stuffing box the coating on the shaft is worn off as the coating ordinarily provides an imperfect bearing surface. The wearing away of the coating requires frequent cleaning of the shaft and re-enameling or coating thereof.

The principal object of the invention is to provide a bearing for a shaft having a protective coating in which the coating on the shaft is not worn off upon rotation of the shaft.

Another object is to provide a bearing for a glass coated rotating shaft in which parts may be substituted without expensive withdrawal of equipment.

Another object is to provide a rotating stuffing box bearing for a glass coated rotating shaft and the like.

Another object is to provide a bearing sleeve sealed upon a coated shaft.

In accordance with the invention, the bearing for an enamel coated rotating shaft has an outer stuffing box secured to a vessel wall and an inner stuffing box secured to the shaft to rotate therewith, the latter being provided with an outer sleeve machined to a true diameter concentric with the axis of the shaft for rotating contact with the outer stuffing box.

An embodiment of the invention is illustrated in the accompanying drawing in which:

Figure 1 is a longitudinal sectional view of the bearing of the invention as employed with an enamel lined shaft and a vessel with only a portion of the wall of the vessel being shown;

Fig. 2 is a view looking at the outer end of the bearing with parts shown in section; and Fig. 3 is a section taken on line 3—3 of Figure 1.

The bearing of the invention illustrated in the drawing comprises in general, the inner stuffing box 1 which is secured to the shaft 2 to rotate therewith within the outer stuffing box 3 which is secured to the vessel wall 4. The shaft 2 is coated with ceramic enamel 5 to prevent corrosion thereof by the contents of the vessel. The shaft may be driven by a motor or other suitable drive (not shown) to actuate a propeller blade or other agitator for agitation of the contents of the vessel.

The inner stuffing box 1 has a gland 6 which encircles the shaft 2 in close fitting relation therewith and extends therealong a short distance. The outer end of gland 6 is provided with the outwardly directed circumferential flange 7 and the inner end has the tapered face 8.

A sleeve 9 is assembled concentrically around the gland 6 and the shaft 2 and extends slightly beyond the inner end of the stuffing box 1. One end portion of the sleeve 9 extends to a line adjacent the flange 7 of gland 6 while the other end is provided with the inwardly turned flange 10 which encircles the shaft 2 in close relation therewith.

The inner face 11 of the flange 10 is tapered opposite to tapered face 8 of gland 6 and a wedge-shaped recess is formed therebetween.

The packing 12 is mounted around the shaft 2 within the recess formed between the gland 6 and the sleeve 9. The packing 12 is of any suitable compressible non-corrosive material. Pressure is applied to the packing 12 to compress the same into tight contact with the shaft 2 by the gland 6 when the latter is moved toward the flange 10 by means of cap screws 13 which extend through the flange 7 of gland 6 and are threaded into the end of the sleeve 9.

This compressing of the packing 12 tightly secures and seals the inner stuffing box 1 to the shaft 2 for rotation therewith.

The sleeve 9 of the stuffing box 1 is machined on the outside to close tolerances and is concentric with the axis of rotation of the shaft 2. The compression of the packing 12 to secure the box 1 to the shaft 2 does not effect the true outer bearing surface of the sleeve 9 and the sleeve presents a substantially smooth perfectly turned surface for contact or bearing with the outer stuffing box 3.

The outer stuffing box 3, within which the inner box 1 rotates upon rotation of the shaft 2, comprises in general the gland 14, the outer packing 15 and the circumferential flange 16 of the sleeve member 17. The member 17 extends through an opening in the vessel wall 4 and is welded to the wall to constitute a reinforcement therefor.

The member 17 extends for substantially the length of stuffing box 3 and the flange 16 thereof closely encircles the inner rotating stuffing box 1 at the end thereof provided with the flange 10 of sleeve 9. The flange 16 has an inner face 18 that is tapered from the perpendicular in the same direction as the face 11 of the flange 10.

The packing 15 of stuffing box 3 and the gland 14 are assembled within sleeve member 17 and around the inner stuffing box 1.

The outer end of gland 14 is provided with the circumferential flange 19 which is disposed adjacent the outer surface of reinforcement member 17. Cap screws 20 extend through the flange 19 and are threaded into the member 17 to secure the gland 14 thereto.

The inner face 21 of the gland 14 tapers oppositely to face 18 of the flange 16 and in the same direction as the face 8 of the gland 6.

The packing 15 which is of a suitable bearing material is confined around the inner stuffing box 1 within the recess between the tapered faces 18 and 21, respectively of the flange 16 and the gland 14. This locates the packing 15 substantially concentrically with the packing 12 of the inner box 1.

The packing 15 is compressed between flange 16 and gland 14 to seal the bearing between the inner stuffing box 1 and the outer stuffing box 3, when the gland 14 is moved toward the flange 16 by tightening the screws 20.

The several metal parts of the stuffing boxes are fabricated from a suitable non-corrosive alloy and the packings 12 and 15 are of impregnated materials that are resistant to corrosion by the contents of the vessel with which the bearing of the invention is employed.

The seals for the entire assembly are provided by the outer packing 15 which is compressed against the smoothly machined surface of the sleeve 9 and the packing 12 compressed between the sleeve 9 and shaft 2 within the location of the outer packing 15.

In assembling the stuffing boxes with the shaft 2 inner box 1 is tightly secured to shaft 2 to rotate therewith and the outer stuffing box 3 is adjusted to permit free rotation of the inner box 1 therein.

Since the stuffing box 1 rotates with the shaft, the enamel coating 5 is not worn off the shaft.

The packing 15 of stuffing box 3 bears against the smooth surface of the rotating sleeve 9, and is readily replaceable when worn without disturbing the inner stuffing box 1.

Various embodiments of the invention may be employed within the scope of the accompanying claims.

I claim:

1. A bearing for a rotating shaft and the like, which comprises an inner gland and an outer sleeve concentrically assembled around a shaft and confining packing material therebetween against said shaft, means to secure said gland and sleeve members together and compress the packing material disposed therebetween into tight fitting relation with said shaft to effect rotation of said members and packing with the shaft, and a sealed stuffing box provided concentrically around said sleeve and inner gland and within which the sleeve rotates upon rotation of the shaft.

2. A bearing for a rotating shaft having a protective coating to protect the same from corrosion, which comprises an inner stuffing box secured to said shaft to rotate therewith and having an outer sleeve machined to close tolerance limits providing a substantially smooth outer bearing surface for said box, and an outer stuffing box disposed concentrically around said inner stuffing box and tightened less than said inner stuffing box to provide for free rotation of the sleeve of the inner stuffing box therein when the latter is rotated by said shaft.

3. A bearing for a rotating shaft having a protective coating of non-uniform thickness to protect the same from corrosion which comprises an inner stuffing box, a packing tightly compressed within said box to secure the latter to said shaft for rotation therewith, an outer sleeve for said inner box machined to close tolerance limits of true concentricity with the axis of rotation of the shaft, and an outer stuffing box disposed concentrically around said inner stuffing box and having a packing compressed therein into contact with said concentric sleeve with said packing providing a bearing and seal for the inner stuffing box upon rotation of the latter by said shaft.

4. In a bearing for a shaft having surface irregularities, a stuffing box sleeve having a packing therein mounted on the shaft and having said packing tightened thereon to compel rotation of the sleeve with the shaft, the outer surface of the sleeve being machined circular and concentric to the axis of rotation of the shaft for providing the same as a supporting bearing for the shaft unaffected by the surface irregularities of the shaft.

HENRY A. SCHMITZ, Jr.

REFERENCES CITED

The following references are of record in the file of this patent:

UNITED STATES PATENTS

| Number | Name | Date |
| --- | --- | --- |
| 1,093,620 | Hanna et al. | Apr. 21, 1914 |
| 1,139,120 | Hoffman | May 11, 1915 |
| 2,137,328 | Bissell | Nov. 22, 1938 |
| 2,293,505 | Hillier | Aug. 18, 1942 |